United States Patent
Hamill-Keays et al.

(10) Patent No.: US 6,223,046 B1
(45) Date of Patent: Apr. 24, 2001

(54) SYSTEM AND METHOD FOR COORDINATING NOTIFICATION REQUESTS FOR TERMINAL AVAILABILITY

(75) Inventors: Jeremy Hamill-Keays, Sollentuna (SE); Petri Björk, Helsinki (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/212,184

(22) Filed: Dec. 15, 1998

(51) Int. Cl.$^7$ ................................ H04B 7/00; H04Q 7/20
(52) U.S. Cl. ......................... 455/512; 455/434; 455/466
(58) Field of Search ................................ 455/466, 461, 455/433, 432–435, 445, 458, 450, 510, 512, 527; 370/216, 343

(56) References Cited

U.S. PATENT DOCUMENTS

| | | | |
|---|---|---|---|
| 4,554,677 | 11/1985 | Smith et al. | 455/54 |
| 5,226,071 | * 7/1993 | Bolliger et al. | 455/435 |
| 5,251,209 | 10/1993 | Jurkevich et al. | 370/82 |
| 5,457,735 | * 10/1995 | Erickson | 455/450 |
| 5,537,684 | 7/1996 | Cassidy et al. | 455/34.1 |
| 5,553,061 | 9/1996 | Waggener, Jr. et al. | 370/17 |
| 5,555,264 | 9/1996 | Sällberg et al. | 370/17 |
| 5,570,411 | 10/1996 | Sicher | 379/57 |
| 5,574,934 | 11/1996 | Mirashrafi et al. | 395/800 |
| 5,574,977 | 11/1996 | Joseph et al. | 455/58.1 |
| 5,579,372 | * 11/1996 | Astrom | 455/412 |
| 5,636,223 | 6/1997 | Reardon et al. | 370/431 |
| 5,878,351 | * 3/1999 | Alanara et al. | 455/466 |
| 5,901,363 | * 5/1999 | Toyryla | 455/527 |
| 5,905,960 | * 8/1999 | Nicholl et al. | 445/450 |
| 5,960,362 | * 9/1999 | Grob et al. | 455/527 |

FOREIGN PATENT DOCUMENTS

| | | |
|---|---|---|
| WO 94/07338 | 3/1994 | (WO) . |
| WO 96/03843 | 2/1996 | (WO) . |

* cited by examiner

*Primary Examiner*—Nguyen T. Vo
*Assistant Examiner*—Charles N. Appiah
(74) *Attorney, Agent, or Firm*—Jenkens & Gilchrist, P.C.

(57) ABSTRACT

A telecommunications system and method is disclosed for coordinating requests by applications for notification of when a mobile terminal becomes available in order to allow each requesting application to contact the mobile terminal in a logical order without burdening the system with numerous simultaneous contact attempts by the various requesting applications. When attempts to contact a mobile terminal directly by different applications are unsuccessful, a control node, such as a Home Location Register (HLR) or a Service Control Point (SCP) within an Intelligent Network (IN), can receive notification requests from these nodes or applications and prioritize them according to the time received and/or the priority of each requesting application. Thus, priorities between different applications can be set and intervals between notifications can be controlled to values appropriate for the requesting applications in order to provide an efficient and effective system and method for coordinating notification requests. Therefore, applications which have requested notification are less likely to meet congestion following notification.

26 Claims, 5 Drawing Sheets

SYSTEM AND METHOD FOR COORDINATING NOTIFICATION REQUESTS FOR TERMINAL AVAILABILITY

FIELD OF THE INVENTION

The invention relates generally to telecommunications systems and methods for informing requesting nodes that a terminal has become available, and more particularly, to a system and method for coordinating terminal availability notifications.

BACKGROUND OF THE INVENTION

Cellular telecommunications is one of the fastest growing and most demanding telecommunications applications. Today it represents a large and continuously increasing percentage of all new telephone subscriptions around the world.

Figure 1:
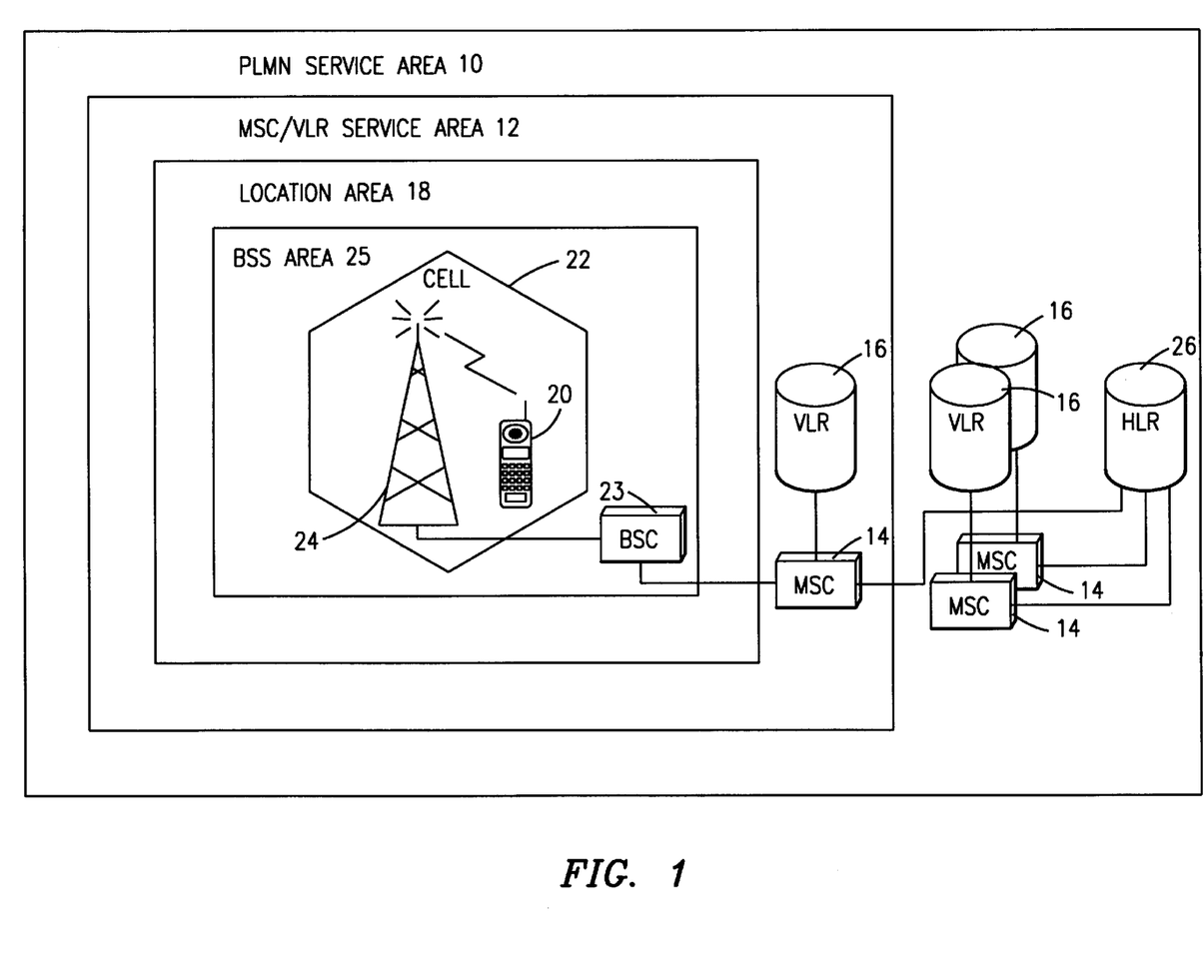
FIG. 1 is a block diagram of a conventional wireless telecommunications system.

With reference now to FIG. 1 of the drawings, there is illustrated a Global System for Mobile Communications (GSM) Public Land Mobile Network (PLMN), such as wireless network 10, which in turn is composed of a plurality of areas 12, each with a Mobile Services Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls the LA 18. Each Location Area 12 is divided into a number of cells 22. Mobile Station (MS) 20 is the physical equipment, e.g., a car phone or other portable phone, used by mobile subscribers to communicate with the wireless network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS 24 is the physical equipment, illustrated for simplicity as a radio tower, that provides radio coverage to the geographical part of the cell 22 for which it is responsible. It should be understood that the BSC 23 may be connected to several BTSs 24, and may be implemented as a stand-alone node or integrated with the MSC 14. In either event, the BSC 23 and BTS 24 components, as a whole, are generally referred to as a Base Station System (BSS) 25. It should be noted that the BSC 23 functionality can be included within the MSC 14, instead of being implemented as a separate node as shown in FIG. 1.

With further reference to FIG. 1, the PLMN Service Area or wireless network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If an MS 20 roams into a new MSC/VLR area 12, the VLR 16 connected to that MSC 14 will request data about that MS 20 from its home HLR database 26 (simultaneously informing the HLR 26 about the current location of the MS 20). Accordingly, if the user of the MS 20 then wants to make a call, the local VLR 16 will have the requisite identification information without having to reinterrogate the home HLR 26. In the aforedescribed manner, the VLR and HLR databases 16 and 26, respectively, contain various subscriber information associated with a given MS 20.

In some instances, the MS 20 may not respond to attempts to contact it for a variety of reasons, including being powered off, being in radio shadow, congestion, etc. If the MS 20 cannot be reached, the party or application trying to contact the MS 20 normally has to retry contacting the MS 20 after a period of time. An alternative to this is for the party or application to request the network 10 to notify it of when the MS 20 is known to be available, for example, at power on, location registration, or contact by another party. This request is normally made to a control point (not shown) in the network 10 which stores data indicating the address of the party or application who requires notification.

In GSM networks, notification to the requesting application of the availability of the MS 20 normally occurs in the situation where a Short Message Service Center (SMS-C) (not shown), which has unsuccessfully attempted to deliver a short message to the MS 20, requests the HLR 26 to send an "Alert" message to the SMS-C when the MS 20 becomes available. If more than one SMS-C is requesting an "Alert" message, timers can be implemented within the network 10 to coordinate the alert procedures.

However, there are many other types of applications being developed that also need to know when an MS 20 becomes available, such as voice mail call-back, call completion, and e-mail delivery. In order to allow all the requesting applications to contact the MS 20, a management procedure needs to be implemented to notify the requesting applications in a coordinated fashion of when they can attempt to contact the MS 20. The timers currently utilized for coordinating SMS "Alert" messages do not allow for the different time needs for various types of nodes and applications.

It is, therefore, an object of the present invention to provide a system and method for coordinating terminal availability notifications for a variety of requesting nodes and applications.

It is a further object of the present invention to allow requesting nodes and applications to have a priority notification associated therewith in order to allow a control node to prioritize the notification requests.

It is still a further object of the present invention to provide a timer value for each priority associated with the requesting applications, in which each timer value corresponds to the amount of time needed for a requesting application to complete its communication function toward the terminal.

SUMMARY OF THE INVENTION

The present invention is directed to telecommunications systems and methods for coordinating requests by nodes and applications for notification about when a mobile terminal becomes available, in order to allow each requesting node and application to contact the mobile terminal in a logical order without burdening the system with numerous simultaneous contact attempts by the various requesting nodes and applications. When attempts to contact a mobile terminal directly by different nodes and/or applications are unsuccessful, a control node, such as a Home Location Register (HLR) or a Service Control Point (SCP) within an Intelligent Network (IN), can receive notification requests from these nodes or applications and prioritize them according to the time received and/or the priority of each requesting node or application. Thus, priorities between different applications can be set and intervals between notifications can be controlled to values appropriate for the requesting applications, in order to provide an efficient and effective system and method for coordinating notification requests. Therefore, applications which have requested notification are less likely to meet congestion following notification.

DETAILED DESCRIPTION

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 2:
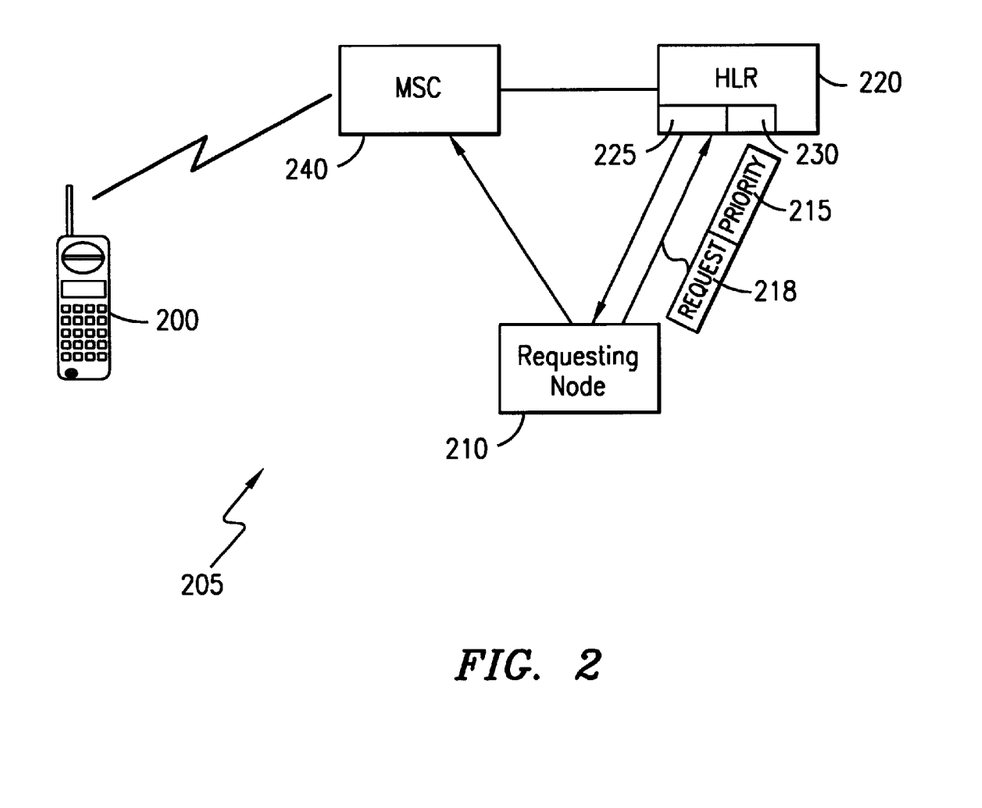
FIG. 2 is a block diagram illustrating the coordination of notification requests received by a control node in accordance with preferred embodiments of the present invention.
Figure 3:
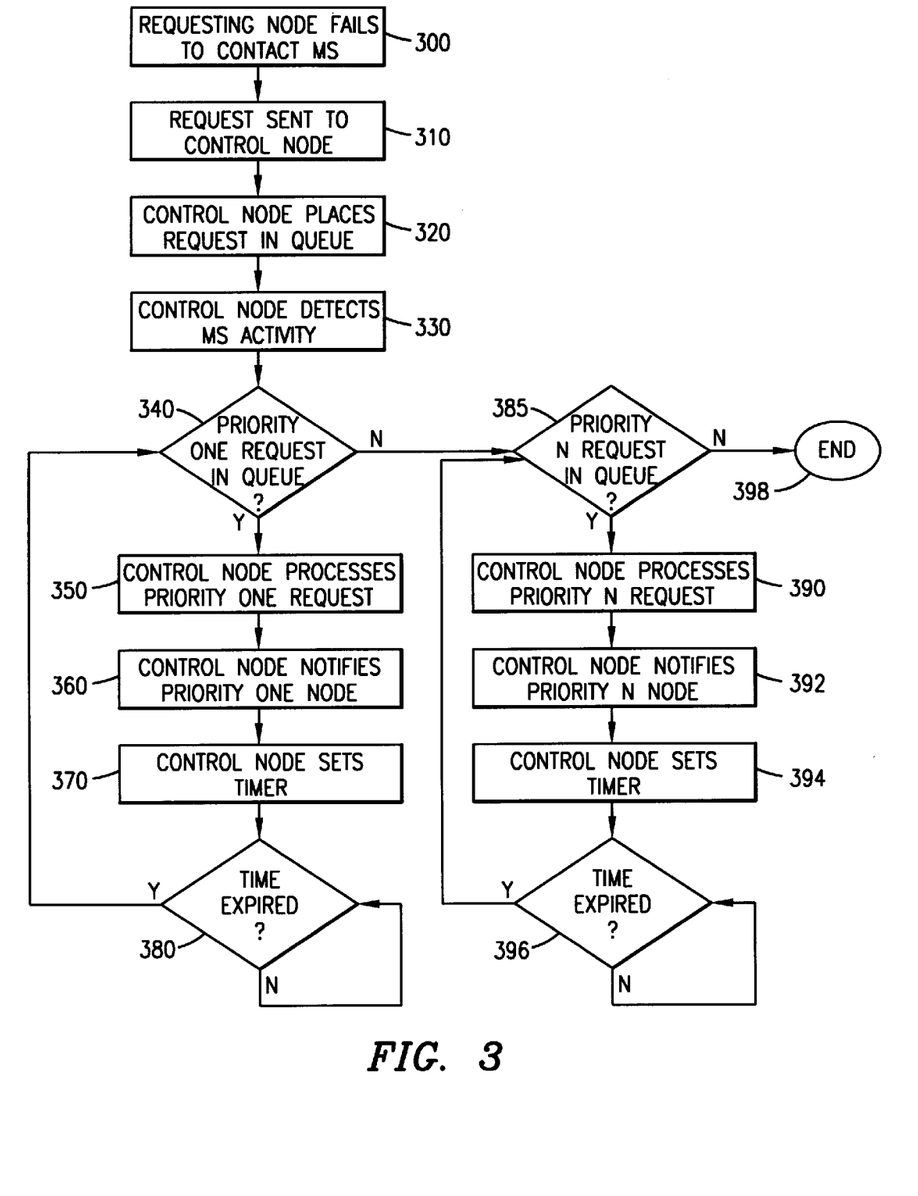
FIG. 3 shows steps in a sample process of coordinating notification requests in accordance with preferred embodiments of the present invention.

With reference now to FIG. 2 of the drawings, which will be described in connection also with FIG. 3 of the drawings, following failure to connect to an MS 200 (step 300), which is in wireless communication with an MSC 240, a node or application 210, such as a voice mail system, an end office or mobile switching center attempting call completion to the MS 200, an e-mail delivery system, or an SMS-C, can send a request 218 to a control node 220 responsible for handling MS 200 availability notifications (step 310). In a cellular network 205, the control node 220 can preferably be an HLR 220 serving the MS 200 and connected to the MSC 240, but in alternative embodiments, the control node 220 can also be an SCP (not shown) within the IN, the former being illustrated.

In preferred embodiments, the application 210 sending the request for notification 218 can also supply a priority 215 associated with that application 210 to the HLR 220 (step 310) to enable the HLR 220 to process the requests 218 more efficiently and effectively. For example, the voice mail system can have priority one, while the SMS-C can have priority two. It should be noted that if the requesting application 210 does not supply a priority 215 to the HLR 220, the HLR 220 can assign a priority 215, e.g., the lowest priority, to the requesting application 210. Alternatively, the HLR 220 can calculate the priority 215 based upon the supplied address of the application 210.

The HLR 220 then places the request 218 in a queue or list 225 for the subscriber associated with the MS 200 (step 320). When the HLR 220 detects MS 200 activity (step 330), the HLR 220 begins to process the notification queue 225 for the associated MS 200 (step 350). For example, when the MS 200 powers up or sends a location update request to the HLR 220, or if the control node is an SCP and the SCP receives notification that a contact attempt by another party has been successful and has been completed, the HLR 220 or SCP, respectively, notifies the requesting nodes or applications 210 that the MS 200 has become available.

The HLR 220 begins processing the requests 218 (step 350) by scanning the list 225 for the notification request 218 which has highest priority 215 (step 340), e.g., priority one. If more than one notification request 218 has priority one (step 340), the HLR 220 can preferably process the requests 218 (step 350) according to the time the request 218 was received by the HLR 220, with the first received request 218 with priority one being handled first. Alternatively, the HLR 220 can process the first priority one request 218 that it scans regardless of which priority one request 218 was actually received first. The HLR 220 then notifies each requesting application 210 in order of priority 215 that the MS 200 has become available (step 360).

Each priority 215 has a timer 230 associated therewith in accordance with the time it takes to process that type of communications function. Upon notification of an application 210 (step 360), the HLR 220 sets the timer 230 (step 370) and waits for the designated period of the timer 230 (step 380) before handling the next notification request 218 (step 340). At time-out of the designated period (step 380), the HLR 220 scans for a notification request 218 of the same priority 215 (step 340), and if found, the request 218 is handled in the same manner (steps 350–380). If no request 218 at the same priority 215 is found (step 340), the next priority (not shown) will be handled (steps 385–398) and so on. A new timer (not shown) associated with this priority can then be utilized. It should be understood that alternatively the time period for the timers 230 associated with each priority 215 can remain the same.

The setting of timers 230 on a priority level 215 basis allows requests 218 by different types of applications 210 to be handled in an orderly and sequential manner. For example, delivery of a voice mail will usually take far longer than the delivery of a short message. Therefore, the system adjusts itself easily to these different periods, and service delivery becomes coordinated using different timers 230. Priority handling also allows important applications 210, such as those involving requests 218 from people rather than machines, to be handled first.

Figure 4:
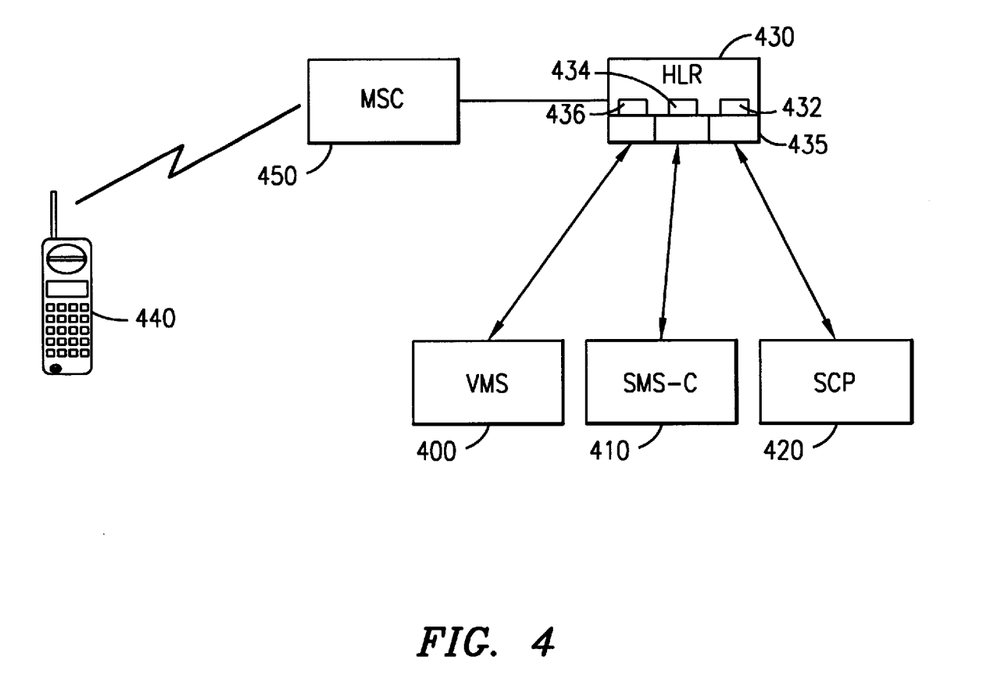
FIG. 4 illustrates a sample situation in which a control node must process and coordinate notification requests by several requesting nodes within a cellular network in accordance with the teachings of the present invention.
Figure 5:
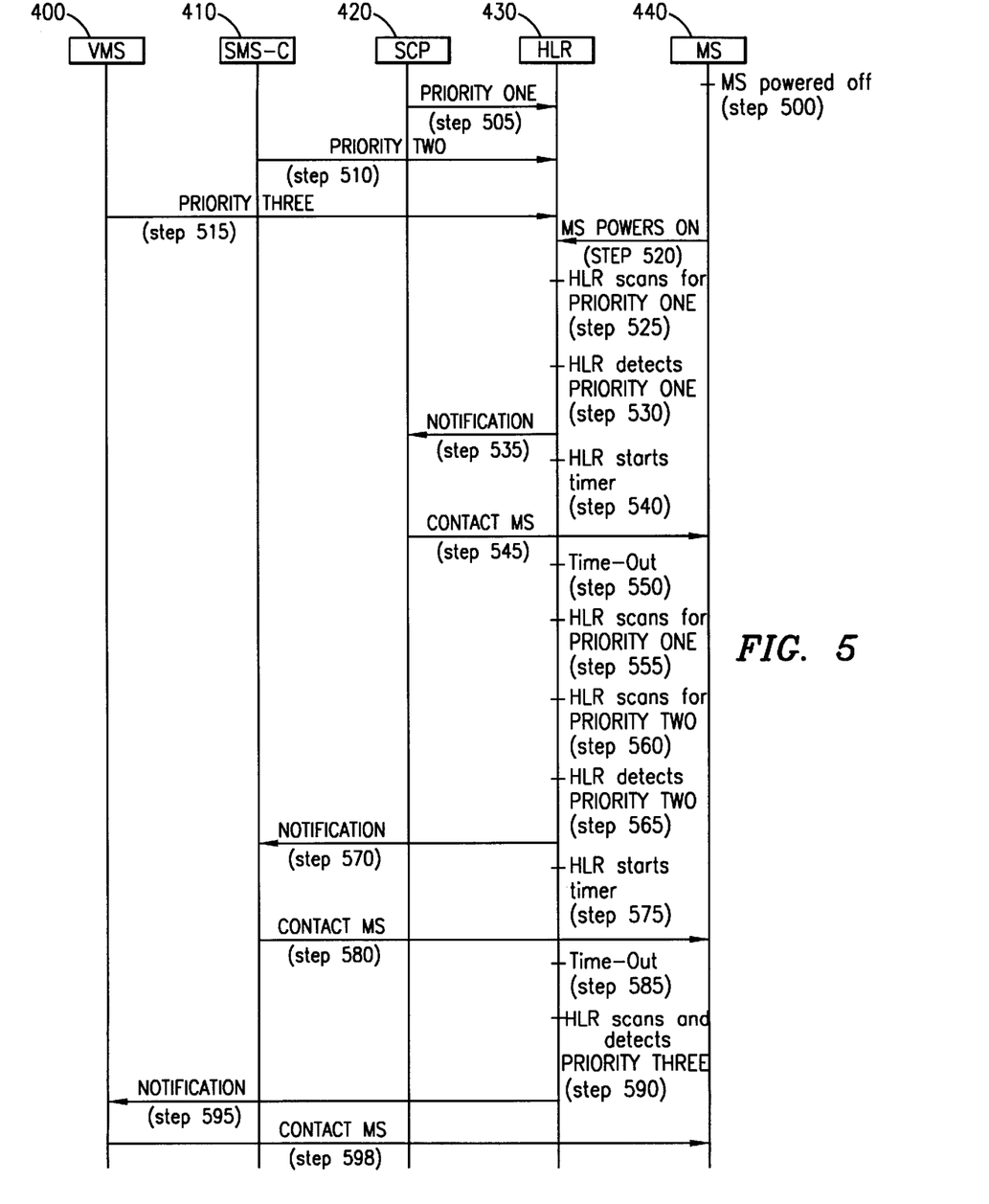
FIG. 5 describes the steps involved in the sample situation illustrated in FIG. 4.

FIGS. 4 and 5 illustrate a sample situation in which several nodes, e.g., a Voice Mail System (VMS) 400, an SMS-C 410 and an SCP 420, require notification of when the MS 440 becomes available. The SMS-C 410 has a message to be delivered, the VMS 400 has a voice mail stored for the MS 440, and the SCP 420 has a request from a caller to connect to the MS 440 when the MS 440 becomes available. In this example, each of these applications 400, 410 and 420 has failed in a previous attempt to contact the MS 440 via the MSC 450 due to the MS 440 being powered off (step 500). The SCP 420 has contacted the HLR 430 and requested a notification to take place with priority one (step 505). In addition, the SMS-C 410 has contacted the HLR 430 and requested a notification with priority two (step 510), and the VMS 400 has a priority three request stored within the queue 435 in the HLR 430 (step 515).

When the MS 440 powers on (step 520) and the HLR 430 detects activity, the HLR 430 scans the list of notification requests 435 for the subscriber trying to detect a priority one notification (step 525). It should be noted that an initial timer may be incorporated before this scan takes place allowing call-back services from emergency service to take place prior to notifying other requesting applications. After scanning through the list of notification requests 435 (step 525), the HLR then detects the priority one notification request (step 530) and contacts the SCP 420 associated with this request (step 535). The HLR 430 then starts the timer 432 associated with priority one (step 540), e.g., the HLR 430 waits for a period of 5 minutes before scanning the list 435 again, and during this time, the SCP 420 proceeds to set up the call-back call towards the MS 440 (step 545).

Following the time-out of the priority one timer 432 (step 550), the HLR 430 then scans the list 435 for more notification requests of priority one (step 555). It should be understood that any detection of subscriber activity while the priority one timer 432 is set is ignored, e.g., the ending of the call-back call does not initiate rescanning of the queue 435. This is due to the fact that the source of such a call cannot be guaranteed to be the call-back call. In this case, no more priority one requests are found in the queue 435 (step 555), and the HLR 430 then proceeds to scan the queue 435 for priority two requests (step 560). The HLR 430 then detects the request from the SMS-C 410 (step 565) and notifies the SMS-C 410 (step 570), while initiating a timer 434 of 1 minute (step 575). The SMS-C 410 then proceeds to deliver the short message to the MS 440 (step 580). After time-out of the 1 minute priority two timer 434 (step 585), further scanning of the notification request queue 435 takes place (step 590) and the VMS 400 notification request is finally processed using the priority three timer 436 (step 595). The VMS 400 can then contact the MS 440 and deliver the voice mail notification to the MS 440 (step 598).

Advantageously, by implementing timer values appropriate for the type of application being notified, rather than using a single timer value for all applications, a more efficient and effective service can be provided to both the operator and the subscriber. In addition, by utilizing a central control node to control the notification and initiation of services, a coordinated approach for handling messages and alerts in an orderly and sequential manner can be achieved. Furthermore, it should be noted that the system and method disclosed herein can be implemented within a cellular network or any other type of network, such as a fixed Public Switched Telephone Network, in which the SCP or a Service Switching Point (SSP) would serve as the control node, and the SCP or SSP would be notified when the subscriber becomes available. In the fixed PSTN, a subscriber may be unavailable, for example, when the subscriber's line is busy or when the subscriber has the phone off-hook.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for coordinating requests for notification of when a terminal becomes available after failed attempts to contact said terminal have occurred, said telecommunications system comprising:

a control node for storing said requests for notification and determining when said terminal becomes available; and a first requesting node for sending a first one of said requests for notification to said control node after a first attempt to contact said terminal fails, said first requesting node having a first priority associated therewith, said first priority having a timer associated therewith, said control node processing said first request for notification and informing said first requesting node when said terminal becomes available based upon said first priority, said control node substantially simultaneously setting said timer when said first requesting node is informed, said control node informing any additional requesting nodes that said terminal has become available only after said timer expires.

2. The telecommunications system of claim 1, wherein said first requesting node sends said first priority along with said first request to said control node.

3. The telecommunications system of claim 2, further comprising a second requesting node for sending a second one of said requests for notification along with a second priority associated with said second requesting node to said control node, said second priority being lower than said first priority, said second priority having a second timer associated therewith.

4. The telecommunications system of claim 3, wherein said requests for notification are stored within a queue within said control node, said control node scanning said queue for said requests having said first priority associated therewith, said control node processing said first request and setting said timer associated with said first priority when said control node identifies said first request, said control node scanning said queue for requests having said second priority associated therewith when said timer associated with said first priority expires and said queue does not contain any additional requests having said first priority associated therewith, said control node processing said second request and setting said second timer associated with said second priority when said control node identifies said second request.

5. The telecommunications system of claim 4, further comprising a third requesting node for sending a third one of said requests for notification along with said first priority associated with said third requesting node to said control node, said control node processing said third request and setting said timer associated with said first priority when said control node identifies said third request, said control node processing said second request and setting said second timer associated with said second priority after said control node processes said first and third requests and said timer associated with said first priority for the last processed of said first and third requests expires.

6. The telecommunications system of claim 5, wherein said first request is received by said control node before said third request, said control node processing said first request before said third request.

7. The telecommunications system of claim 1, wherein said terminal is a mobile terminal.

8. The telecommunications system of claim 7, wherein said control node is a home location register associated with said mobile terminal.

9. The telecommunications system of claim 8, wherein said home location register determines that said mobile terminal is available when said mobile terminal performs a location update to said home location register.

10. The telecommunications system of claim 9, wherein said home location register determines that said mobile terminal is available when said home location register detects that the power on said mobile terminal is turned on.

11. The telecommunications system of claim 1, wherein said control node is a Service Control Point within an Intelligent Network.

12. The telecommunications system of claim 1, wherein said first requesting node is a voice mail system, an end office, an e-mail delivery system, a Service Control Point, or a Short Message Service Center.

13. The telecommunications system of claim 1, wherein said first priority associated with said first requesting node is determined by said control node.

14. A method for coordinating requests for notification of when a terminal becomes available after failed attempts to contact said terminal have occurred, said method comprising the steps of:

sending, by a first requesting node, a first one of said requests for notification to a control node after a first attempt to connect to said terminal fails, said first requesting node having a first priority associated therewith, said first priority having a timer associated therewith, said first request for notification being stored within said control node;

determining, by said control node, when said terminal becomes available;

in response to a determination that said terminal is available, processing, by said control node, said first request for notification based upon said first priority;

informing, by said control node, said first requesting node that said terminal is available; and substantially simultaneous to said step of informing, setting said timer associated with said first priority of said first requesting node by said control node, said control node informing any additional requesting nodes that said terminal has become available only after said timer expires.

15. The method of claim 14, wherein said first requesting node sends said first priority along with said first request to said control node.

16. The method of claim 15, further comprising, before said step of determining, the step of:

sending, by a second requesting node, a second one of said requests for notification along with a second priority associated with said second requesting node to said control node, said second priority being lower than said first priority, said second priority having a second timer associated therewith.

17. The method of claim 16, wherein said requests for notification are stored within a queue within said control node, and further comprising, before said step of processing, the step of:

scanning, by said control node, said queue for said requests having said first priority associated therewith, said steps of processing said first request and setting said timer associated with said first priority being performed when said control node identifies said first request; and further comprising, after said step of setting, the steps of:

scanning, by said control node, said queue for requests having said second priority associated therewith when said timer associated with said first priority expires and said queue does not contain any additional requests having said first priority associated therewith;

processing, by said control node, said second request when said control node identifies said second request;

informing, by said control node, said second requesting node that said terminal has become available; and substantially simultaneous to said step of informing, setting, by said control node, said second timer associated with said second priority, said control node informing any additional requesting nodes that said terminal has become available only after said timer associated with said second priority expires.

18. The method of claim 17, further comprising, before said step of determining, the step of:

sending, by a third requesting node, a third one of said requests for notification along with said first priority associated with said third requesting node to said control node; and further comprising, before said step of scanning said queue for requests having said second priority associated therewith, the steps of:

processing, by said control node, said third request when said control node identifies said third request;

informing, by said control node, said third requesting node that said terminal has become available; and substantially simultaneous to said step of informing, setting, by said control node, said timer associated with said first priority, said step of informing said second requesting node that said terminal has become available being performed after said timer associated with said first priority for the last processed of said first and third requests expires.

19. The method of claim 18, wherein said first request is received by said control node before said third request, said step of processing said first request being performed before said step of processing said third request.

20. The method of claim 14, wherein said terminal is a mobile terminal.

21. The method of claim 20, wherein said control node is a home location register associated with said mobile terminal.

22. The method of claim 21, wherein said step of determining that said mobile terminal is available is performed by said mobile terminal performing a location update to said home location register.

23. The method of claim 21, wherein said step of determining that said mobile terminal is available is performed by said home location register detecting that the power on said mobile terminal is turned on.

24. The method of claim 14, wherein said control node is a Service Control Point within an Intelligent Network.

25. The method of claim 14, wherein said first requesting node is a voice mail system, an end office, an e-mail delivery system, a Service Control Point, or a Short Message Service Center.

26. The method of claim 14, further comprising, after said step of sending, the step of:

determining, by said control node, said first priority associated with said first requesting node.

* * * * *

UNITED STATES PATENT AND TRADEMARK OFFICE
CERTIFICATE OF CORRECTION

PATENT NO. : 6,223,046 B1
DATED : May 15, 2001
INVENTOR(S) : Simone Alba et al.

It is certified that error appears in the above-identified patent and that said Letters Patent is hereby corrected as shown below:

<u>Title page,</u>
Item [75], Inventors, "Francesca Canali, Saronna-Varese" should read -- Francesca Canali, Saronno-Varese --.

Signed and Sealed this

Eighth Day of January, 2002

Attest:

*Attesting Officer*

JAMES E. ROGAN
*Director of the United States Patent and Trademark Office*